Jan. 5, 1926.  1,568,832
J. A. HARRISON ET AL
APPARATUS FOR THE MANUFACTURE OF COMPOSITION BUILDING SHEETS OR SLABS
Filed Sept. 12, 1922   8 Sheets-Sheet 2
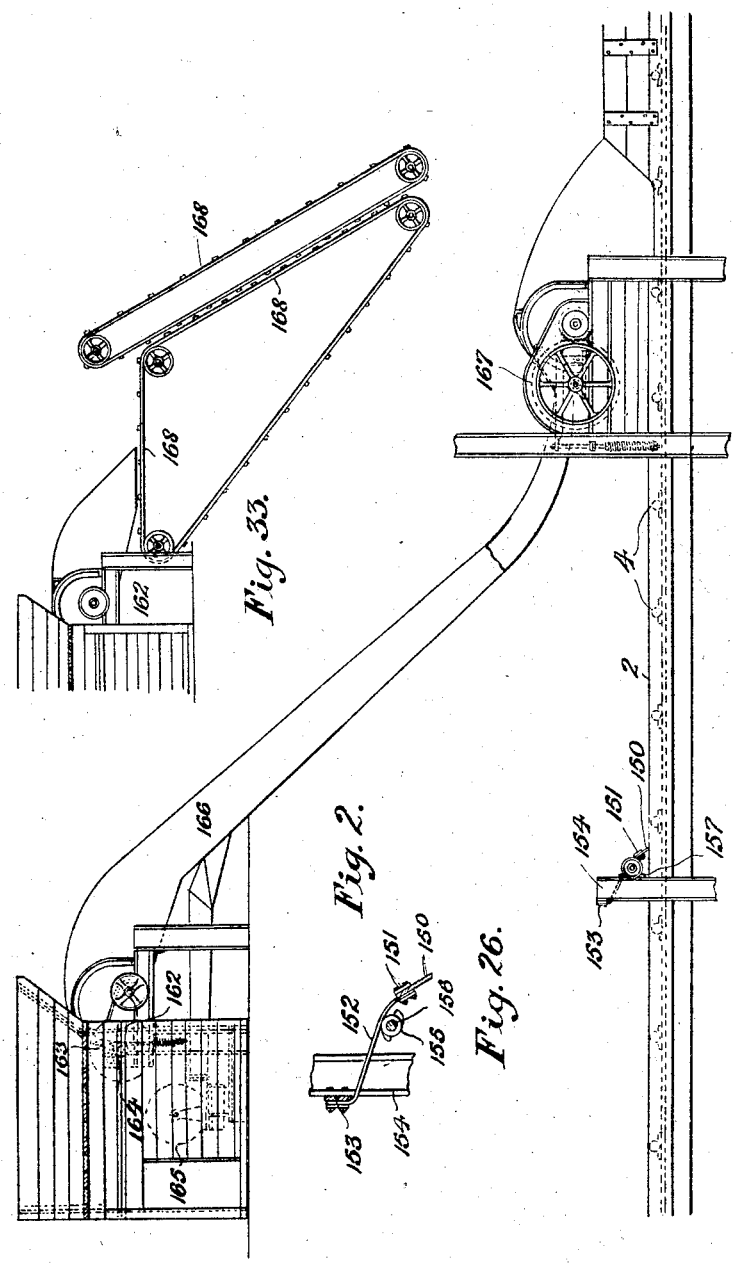
Inventors
J. A. Harrison
O. A. Waschatz
by
Att'y Jan. 5, 1926.                                                    1,568,832
J. A. HARRISON ET AL
APPARATUS FOR THE MANUFACTURE OF COMPOSITION BUILDING SHEETS OR SLABS
Filed Sept. 12, 1922        8 Sheets-Sheet 3
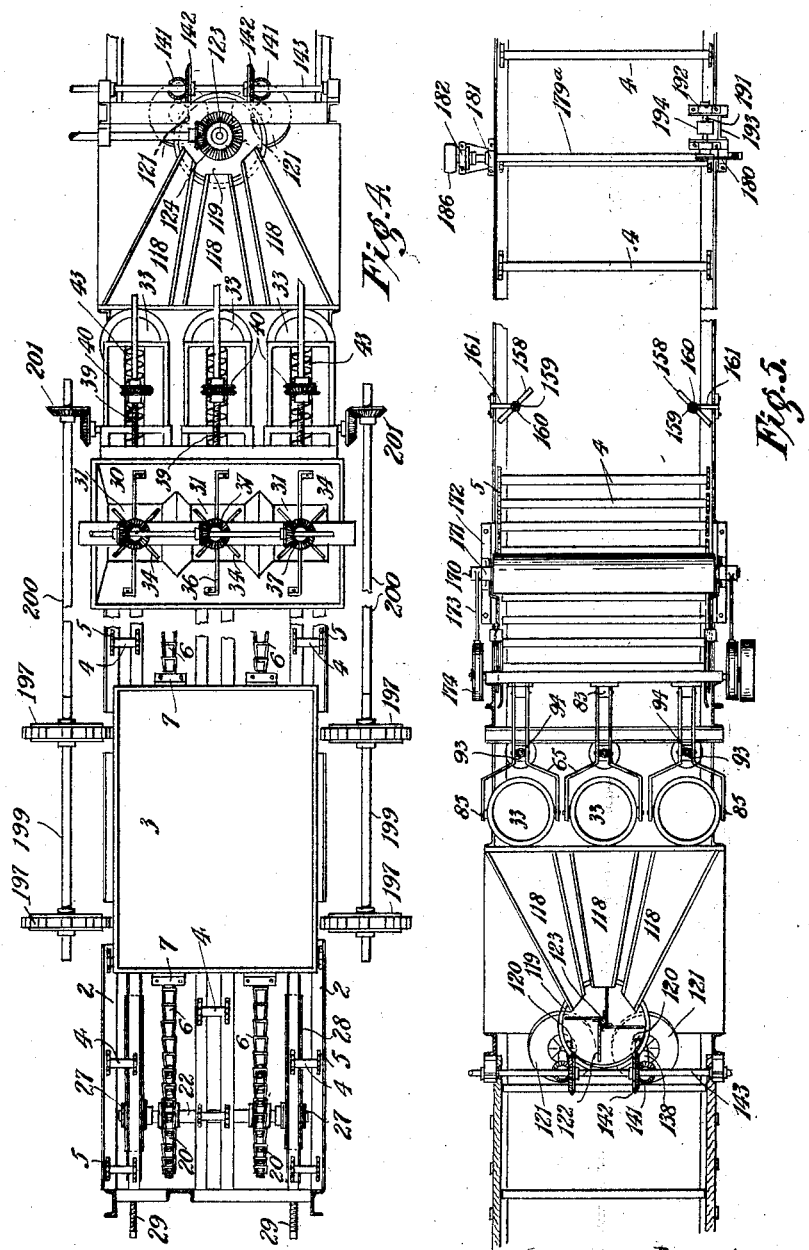
Inventors
J. A. Harrison
O. A. Waschatz
by 
Att'y

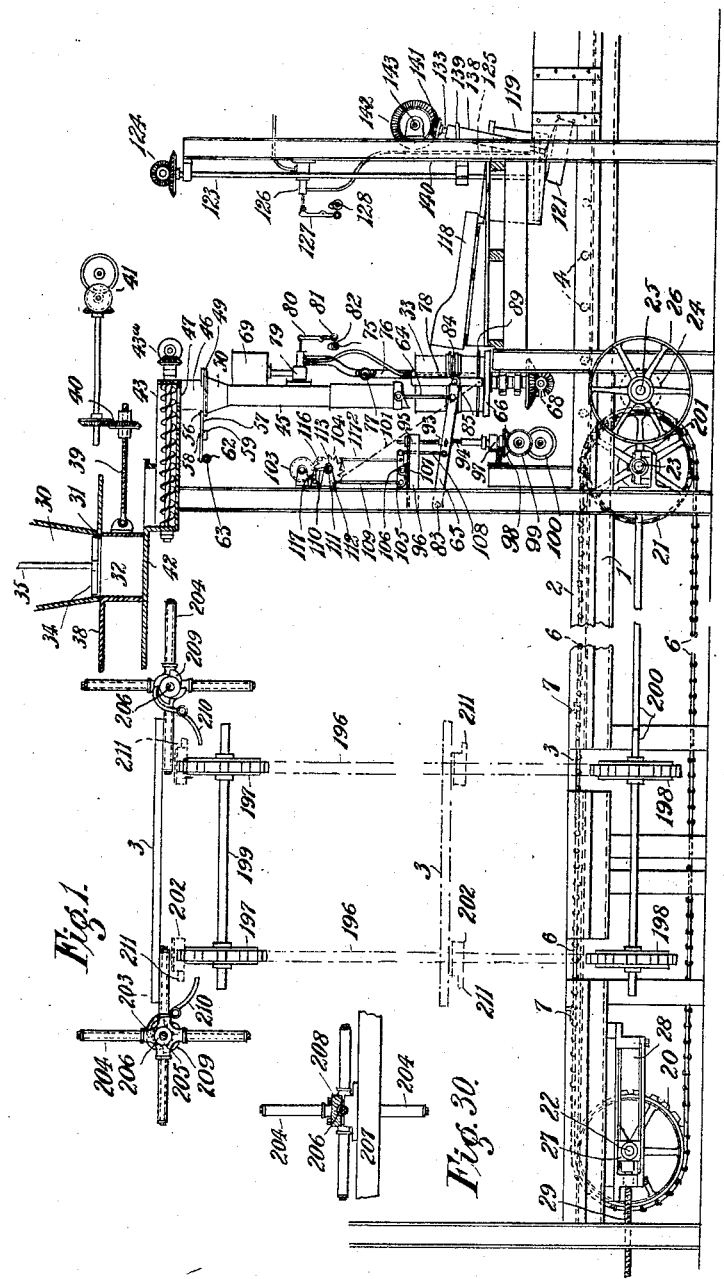

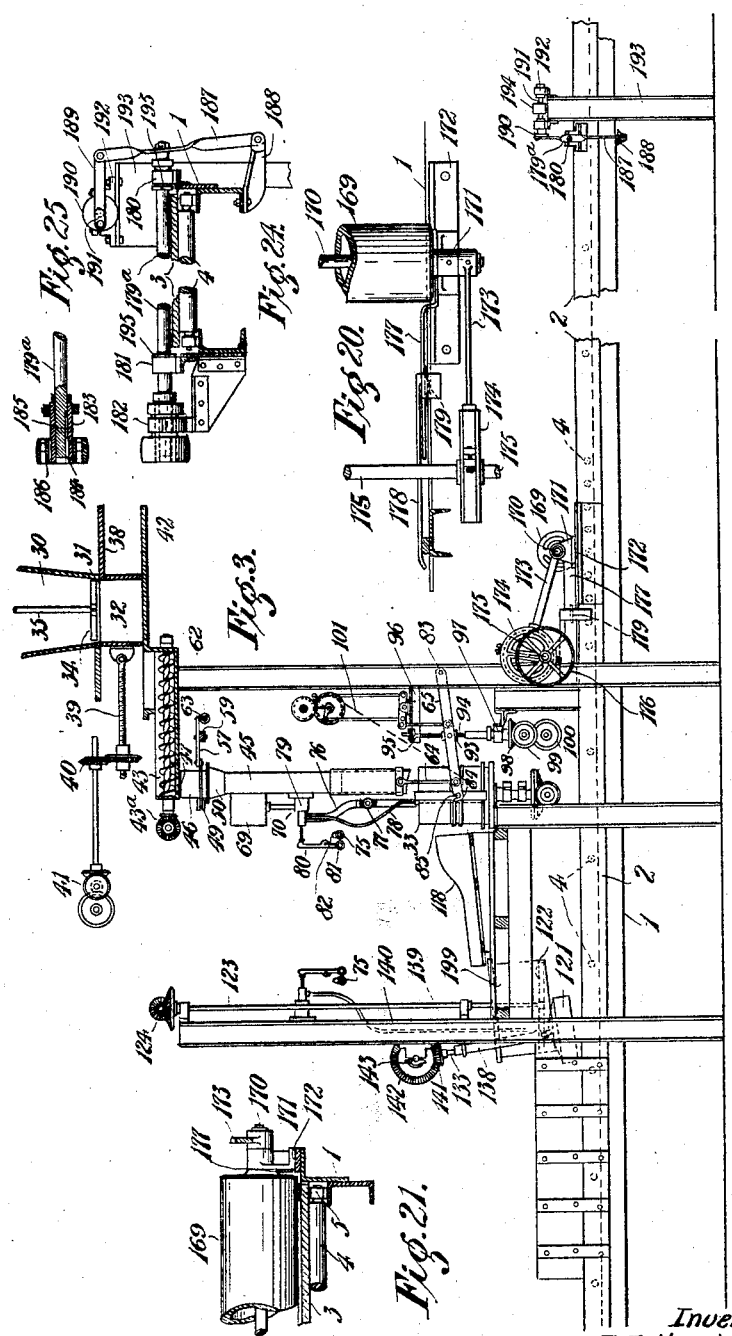

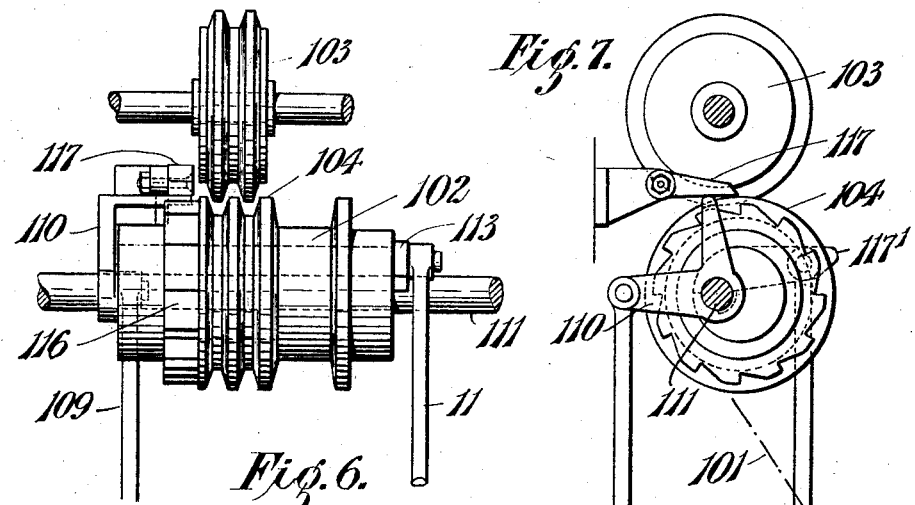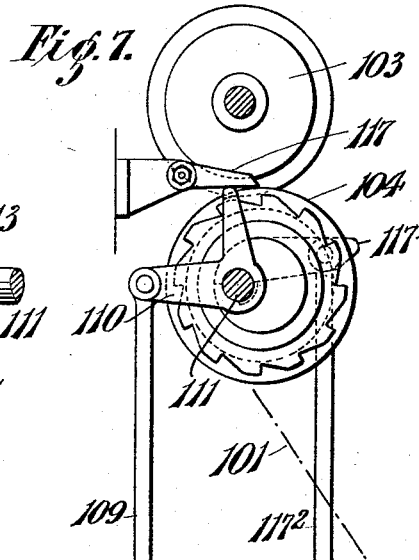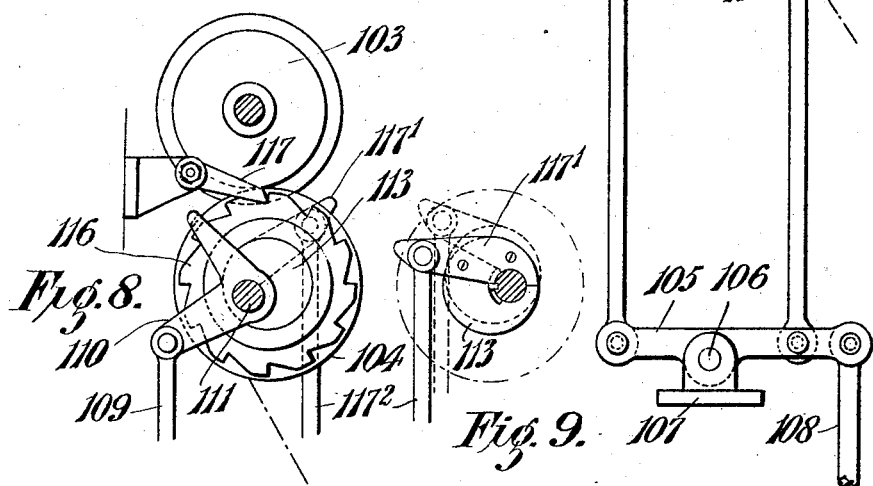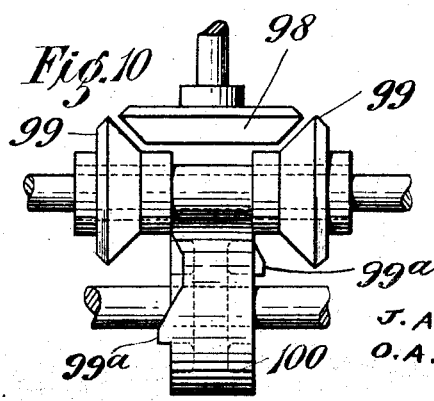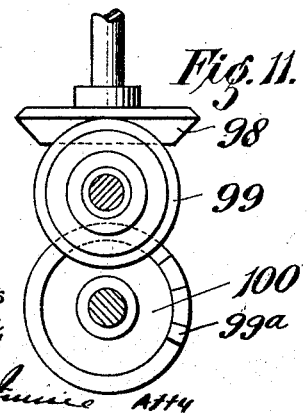

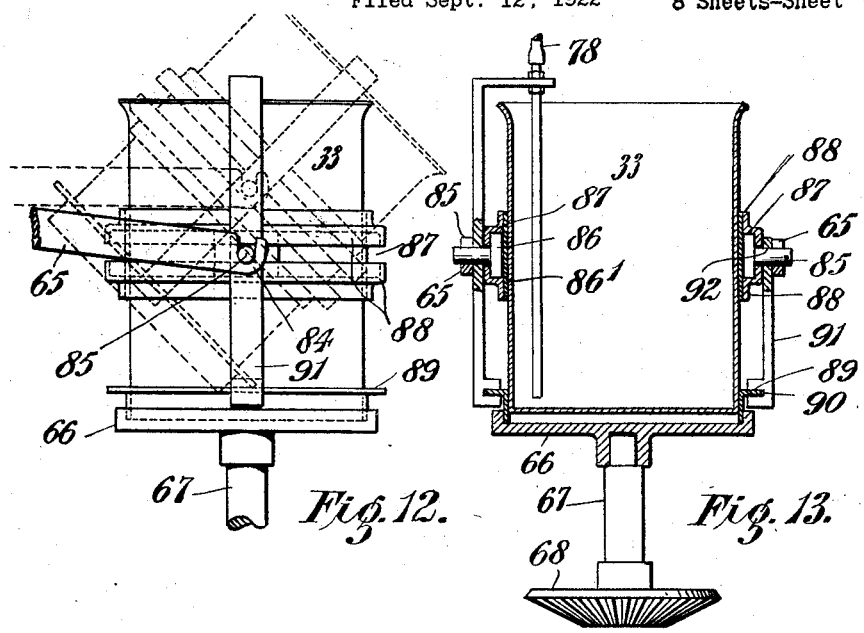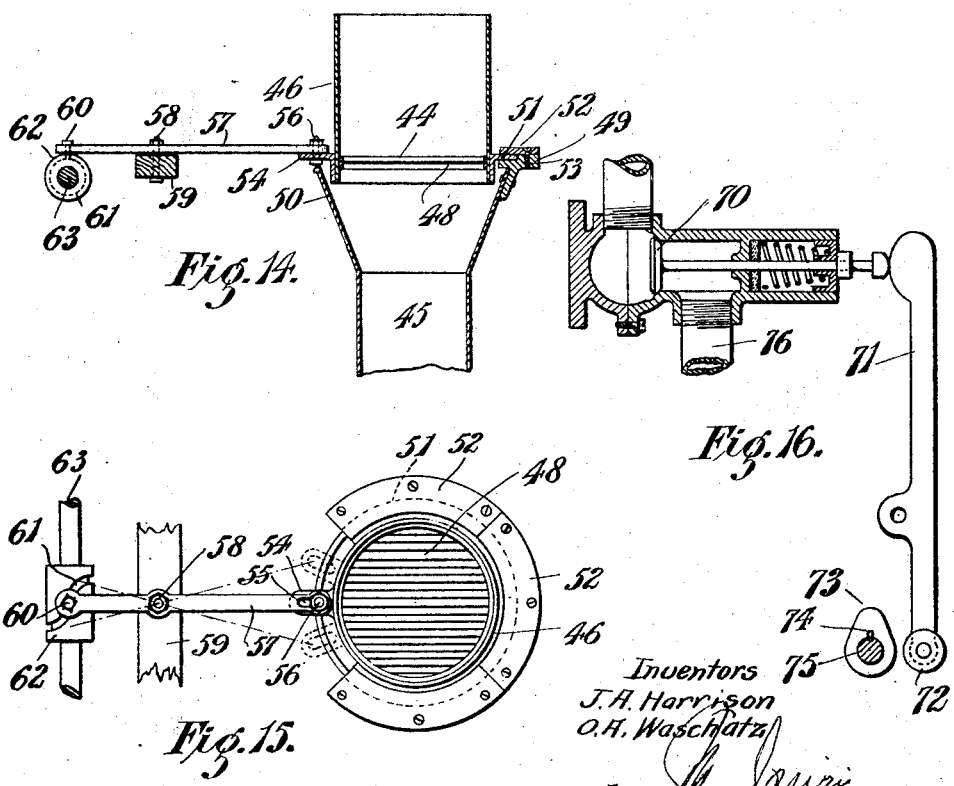

Jan. 5, 1926. 1,568,832
J. A. HARRISON ET AL
APPARATUS FOR THE MANUFACTURE OF COMPOSITION BUILDING SHEETS OR SLABS
Filed Sept. 12, 1922    8 Sheets-Sheet 7
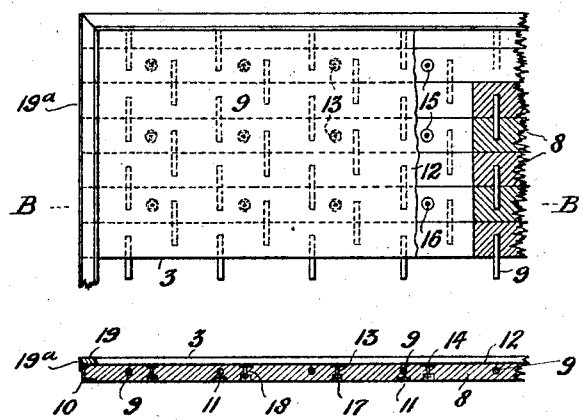
Fig. 27.
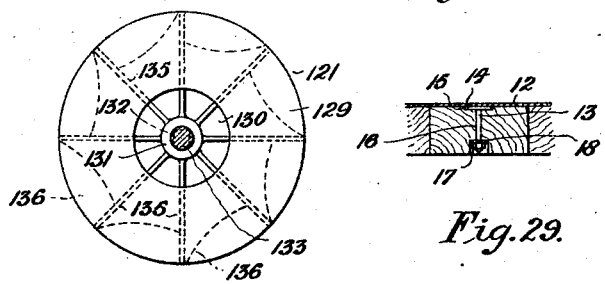
Fig. 28.   Fig. 29.
Fig. 17.
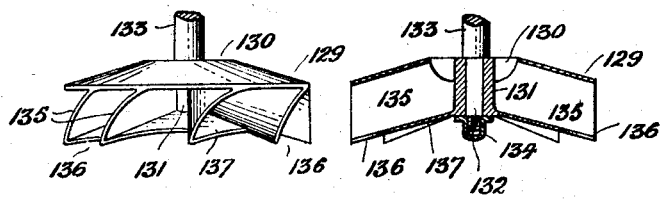
Fig. 18.   Fig. 19.
Inventor
J. A. Harrison
O. A. Waschatz
by
Att'y

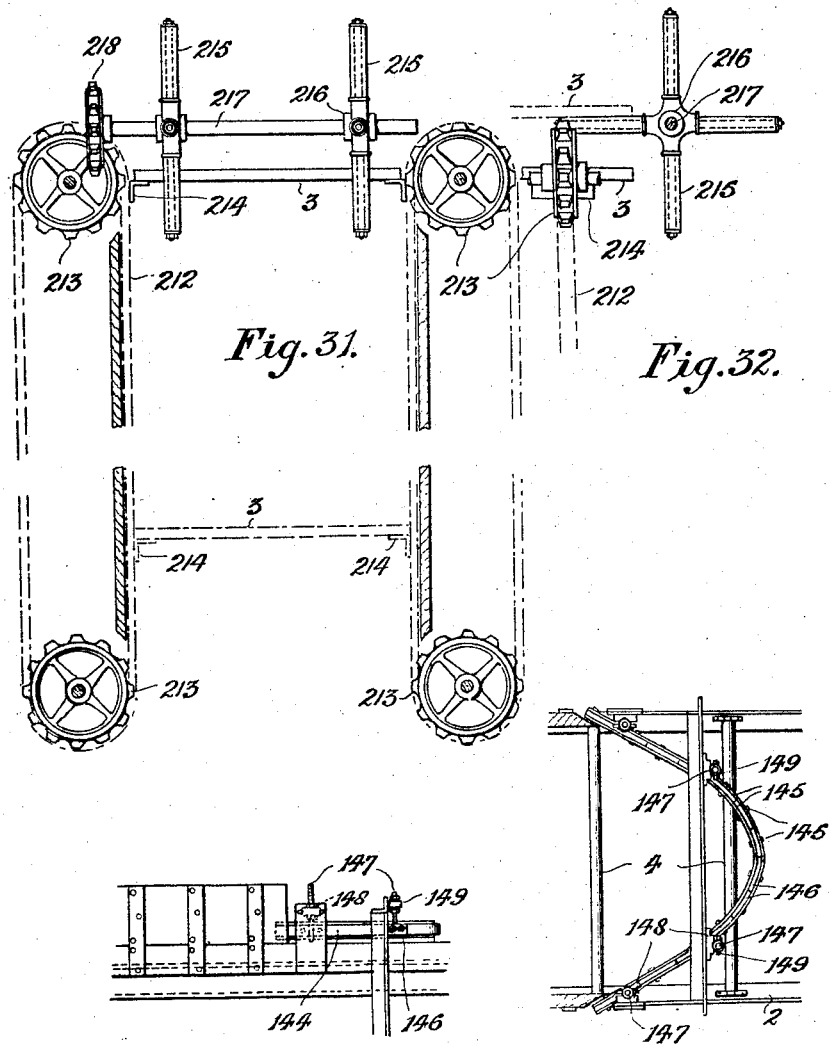

Patented Jan. 5, 1926.

1,568,832

UNITED STATES PATENT OFFICE.

JOHN ARTHUR HARRISON AND OTTO ANTON WASCHATZ, OF WEST RICHMOND, VICTORIA, AUSTRALIA.

APPARATUS FOR THE MANUFACTURE OF COMPOSITION BUILDING SHEETS OR SLABS.

Application filed September 12, 1922. Serial No. 587,780.

*To all whom it may concern:*

Be it known that we, JOHN ARTHUR HARRISON and OTTO ANTON WASCHATZ, both subjects of the King of Great Britain, and residing at West Richmond, in the State of Victoria, Commonwealth of Australia, have invented new and useful Improvements in Apparatus for the Manufacture of Composition Building Sheets or Slabs, of which the following is a specification.

This invention relates to improvements in and associated with apparatus for the manufacture of sheets of fibro-plaster or similar composite material for use as structural elements, but specially for the walls and ceilings of buildings.

The primary object of the improvements is to provide means whereby composite building sheets or slabs, such as those of plaster reinforced and bonded by fibrous material, are produced in a cycle of continuous and mainly automatic operations.

An apparatus according to the invention includes means for automatically depositing the tables, which function as moulds in their subsequent movements, in correct relative and adjacent positions: means for automatically delivering and conveying form a hopper into a mixing bucket a predetermined quantity of plaster material in powdered form as a charge for the production of the face portion of the sheet: means automatically delivering in sequence to said mixing buckets a predetermined quantity of water: compressed air agitating means intermittently employed to provide the correct admixture of plaster and water in said mixing buckets: means automatically delivering the contents of said mixing buckets sequentially to a distributing appliance which distributes the plaster material by splashing action evenly over the whole area of a moving table or mould as it passes under and recedes from said distributing appliance: levelling means disposed in advance of said distributing appliance: a vibratory element destroying any air bubbles in the plaster material levelled on the moving table: automatic air controlled means for delivering teased hempen or like fibres to the first layer of plaster material distributed on the table or mould: knife cleaning means in the fibre teasing mechanism: automatic appliances and apparatus similar to that hereinbefore mentioned for measuring and delivering the plaster and water to mixing chambers wherein the plaster material is admixed by compressed air agitating means: means automatically splashing the mixed plaster material in predetermined quantities sequentially from the mixing chambers to the moving tables or moulds containing the first layer of plaster and the bonding fibre, during the approach of said tables to said distributing chambers: a levelling roller to which continuous rotary and reciprocating movements are imparted: means automatically elevating the moving tables or moulds to a superstructure for subsequent drying operations as they reach the limit of the travel through the apparatus: and means for actuating a multiplicity of tables so as to drive them through the apparatus.

The movements of the material delivering appliances and the mixing and distributing operations are synchronized in relation to the movements of the tables or moulds through the apparatus.

Reference is had to the accompanying drawings, wherein:—

Figure 1 is a view in side elevation of the feed end section of the machine.

Figure 2 is a similar view of an intermediate section of the machine which comprises the hemp teasing and distributing appliance, and the vibratory mechanism for destroying air bubbles in the plaster material on the table or mould.

Figure 3 is a view in side elevation of the third action of the machine, the integers of which function for the performance of the final manufacturing operations.

Figure 4 is a view in plan of portion of Figure 1.

Figure 5 is a plan view of portion of Figure 3.

Figure 6 is a view in front elevation of friction gearing for operating mixing and tipping buckets hereinafter described.

Figure 7 is a view in side elevation of Figure 6, showing the friction wheels out of gear.

Figure 8 is a detail view in side elevation illustrating the friction wheels in gear for actuating a winding drum.

Figure 9 is a detail view illustrating the means for placing the friction wheels in and out of gear.

Figure 10 is a view in front elevation of a friction drive and time-control gear included in the invention and employed in association with various operative parts of the machine.

Figure 11 a view in side elevation of Figure 10.

Figure 12 is a side elevation of one of the tipping buckets supported upon a revolvable table.

Figure 13 is a central vertical section of Figure 12 and shows a driving wheel attached to the vertical shaft of the revolving table.

Figure 14 is a detail view in vertical section of the upper portion of a chute for delivering the powdered plaster material to a mixing and tipping bucket.

Figure 15 is a view in plan of the parts seen in Figure 14 and illustrates an oscillating sieve and its co-acting mechanism.

Figure 16 is a view in sectional elevation, illustrating the construction of control valve and actuating mechanism, several of which are employed for the intermittent supply of water and of compressed air to the tipping and mixing buckets and to the delivering vessels.

Figure 17 is a view in plan of a unit for distributing plaster material onto the moving tables by splashing action.

Figure 18 is a view in front elevation of the distributing unit seen in Figure 17.

Figure 19 is a view in sectional elevation on the line A—A of Figure 17.

Figure 20 is a fragmentary view in plan of a pressure roller having a combined rotary and reciprocating action associated with a guard element to prevent overflow of the plaster material from a moving table.

Figure 21 is a sectional detail view, on an enlarged scale, illustrating the position of the pressure roller in relation to a travelling table.

Figure 22 is a view in plan of a stationary wiping element.

Figure 23 is a side elevation of Figure 22.

Figure 24 is a front elevation of a levelling and surfacing roller having a combined rotary and recoprocating action, associated with its operating mechanism.

Figure 25 is a detail view in section of means for imparting rotary movement to the levelling and surfacing roller.

Figure 26 is a side elevation, partly in section, on an enlarged scale of the vibratory element seen in Figure 2.

Figure 27 is a view illustrating the construction of a table or mould for the manufacture of a composite plaster sheet.

Figure 28 is a vertical section on line B—B of Figure 27.

Figure 29 is a detail sectional view on an enlarged scale illustrating means for fixedly securing a zinc or other metallic surface plate to a table or mould.

Figure 30 is a detail view in side elevation of means for regulating the speed of delivery of the tables or moulds to a travelling conveyor.

Figure 31 is a front view of mechanism for elevating the tables or moulds with their contained manufactured sheets.

Figure 32 is a view in side elevation of portion of the mechanism seen in Figure 3.

Figure 33 illustrates a modified means for delivering the fibre material to the plaster material on the moving tables or mould.

In the drawings, like characters of reference indicate the same or similar parts, and the numeral 1 designates the machine frame which is constructed chiefly of metal having a plurality of longitudinally disposed angle-section metal rails 2 arranged at a suitable distance or distances apart and providing a guide-way for a series of travelling tables or moulds 3 as they are driven through the machine in the manner hereinafter described.

A multiplicity of transversely arranged anti-friction rollers 4 are revolvably mounted in bearings 5 secured to the side rails 2 of the machine frame, and they act as supports for said tables, permitting the same to have free slidable movement in a horizontal plane. Said rollers may be idle rollers, or alternatively can be power driven.

The tables or moulds 3 are placed successively in required operative position upon endless travelling conveyor chains 6 arranged longitudinally between the side rails of the machine frame and furnished with push plates 7 adapted to abut against and force the tables onto said rollers 4 and drive them through the machine, one in advance of the other and at a predetermined rate of travel.

The tables or moulds 3 are illustrated by Figures 27, 28 and 29 and each is built up of a series of transversely disposed timber boards 8 fixedly secured together by dowels 9 in staggered arrangement. The timber boards are further united by end rails 10 of angle-section metal fitted into recesses formed in their end portions, and rigidly fastened by screws or the like. Longitudinally arranged metallic bars 11 are recessed into the bottom of the table and firmly retained in position by screws, and they serve as wearing strips for engagement by the rollers 4, while also binding the boards together in such a manner as to prevent warping.

The upper surface of the table is provided with a surface sheet 12 of zinc or any other approved material suitable for imparting a perfectly smooth face to the plaster sheet or slab moulded thereon. This sheet of zinc is fixedly secured in position upon the upper surface of the table by means of bolts 13 having enlarged heads 14 of square configuration which are secured by sweating or welding to the under surface of the zinc sheet and seated in circular recesses 15 formed in the upper surface of the boards 8—see Figure 29. The shanks of the bolts pass through holes 16 formed in said boards and have their screwed ends fitted with nuts 17 which are recessed into the underside of the boards and adapted to be tightened against washers 18 inserted in said recesses when the end of said bolts are riveted over to prevent the nuts 17 from working loose.

A bead 19 of wood or other approved material is fixedly secured to and projects upwardly from the table at the edges thereof and serves as a thickness gauge, determining the thickness of the plaster sheets to be manufactured thereon. Abutment strips 19$^a$ of rubber or other resilient material are affixed to the ends of the tables 3 to prevent escape of plaster material between the same as they travel through the machine.

The endless conveyor chains 6 pass about sprocket wheels 20 and 21 fixedly mounted upon transverse shafts 22 and 23 which are driven by toothed gearing 24 from a main driving shaft 25. This main driving shaft 25 is revolvably mounted in bearings secured to the machine frame and is furnished with a pulley 26 receiving a power transmission belt from an electric motor, engine or other source of power.

The transverse shaft 22 supporting the sprocket wheels 20 is revolvably mounted in an adjustable bearing 27 which is slidably mounted in a guide 28 formed in the end of the machine frame and adapted to be operated by a screwed spindle 29 so as to adjust the tension of the conveyor chains 6 or to enable said chains to be lengthened or shortened to suit the size of moulding tables employed in the manufacture of composite plaster sheets.

The endless conveyor chains 6 are arranged so as to drive the tables or moulds 3 successively under a plaster mixing, delivery and distributing apparatus which is illustrated more particularly in Figure 1 and is adapted to deliver the first layer of plaster mixture to each of said travelling tables.

This combined mixing and delivery apparatus comprises a feed hopper 30 for the plaster material when in a dry and powdered state, and it is furnished with a series of delivery orifices 31 through which the dry material descends by gravity into slidably mounted measuring bins 32 which are disposed below said orifices and are so dimensioned as to contain a required charge of dry plaster material for delivery to a combined mixing and tipping bucket 33.

The dry plaster material within the feed hopper 30 is maintained in a powder state by means of agitator arms 34 which project radially form a vertical spindle 35 revolvably mounted in bearings 36 and driven by overhead bevel gearing 37 from a suitable source of powder (not shown).

Each measuring bin 32 is furnished with a cut-off plate 38 adapted to cover the discharge orifice 31 of the hopper 30 during the forward reciprocating movement of the measuring bin. The horizontal reciprocating motion of said measuring bin is effected by a worm shaft 39, bevel gears 40, and a time-controlled reversible friction drive gearing 41 illustrated in Figures 10 and 11 and which will be hereinafter more particularly described.

The measuring bin 32 is slidably mounted upon a stationary platform 42 and is adapted at the termination of its forward stroke to deposit its contents into an Archimedean screw conveyor 43. This conveyor is continuously rotated by bevel gearing 43$^a$ and conveys the plaster material to an oscillating sieve 44. Said sieve is revolvably mounted upon the upper end of a telescopic delivery chute 45 through which the plaster material descends by gravity into the combined mixing and tipping buckets 33.

The oscillatory sieve 44 is illustrated in Figures 14 and 15 and comprises a cylindrical vessel 46 disposed below the discharge orifice 47 of the archimedean screw conveyor 43 and has its bottom portion formed of a series of parallel bars or wires 48 upon which the plaster material is deposited by said conveyor. Said sieve is slidably supported by a guide 49 fixedly secured to and partly surrounding the upper bell-mouthed portion 50 of the telescopic chute 45. This guide 49 is recessed to slidably accommodate an angle flange 51 secured to the lower portion of the sieve cylinder 46, and said angle flange is maintained in a slidable position within the guide by segmental-shaped cover plates 52 that are fastened to said supporting guide 49 by means of screws 53.

A lug 54 having a longitudinal slot 55 is fixed to the opposite side of the sieve cylinder 48, and it is pivotally attached by means of a bolt 56 to the slotted end of a lever arm 57. This lever arm is pivotally supported at 58 to a beam 59 and has at its opposite end a depending stud 60 engaging a cam race 61.

This cam race is formed in a collar 62 fitted to a rotary shaft 63 to which motion is transmitted from a power transmission shaft of the machine.

The rotary motion of the shaft 63 imparts continuous oscillatory movement in a horizontal plane to the sieve 44 whereby any lumps of plaster material are thoroughly disintegrated prior to its delivery to the entrance end of the telescopic chute 45.

The lower slidable member of this chute 45 is pivotally attached by rods 64 to a yoked lever 65 forming part of mechanism for elevating, tipping and lowering, in sequence, a combined mixing and tipping bucket 33. The pivotal connection between the lower portion of the telescopic chute with the yoked lever 65 enables the lower movable member of said chute to be raised clear of the bucket prior to, and to facilitate, the tipping operation.

The combined mixing and tipping buckets 33 are detachably supported upon a table 66 which is revolvable in a horizontal plane and is fixedly secured to the upper end of a vertical shaft 67. This table is rotated at required speed by bevel wheel 68, and the buckets 33 are supported on and revolve with said table, receiving in sequence the dry plaster material as it is discharged from the telescopic chute 45.

Water is intermittently admitted to each mixing and tipping bucket 33 from a tank 69, the supply of water being controlled by a valve 70 of the spring type illustrated by Figure 16. This valve is actuated by a pivoted tappet arm 71 having at its lower end a roller 72 adapted for contacting engagement by a cam 73. This cam is slidably mounted upon a feather 74 fixedly secured in a revolvable shaft 75, permitting the same to be adjusted so as to be placed either in or out of engagement with said roller 72 and thereby control the supply of water to the mixing buckets 33.

The water delivery pipe 76 leading from the control valve 70 to the bucket 33 is made in two section connected together by a ball and socket joint 77 or other approved swivel connection which will permit of ready raising and tipping of said bucket.

The plaster material within the bucket 33 is thoroughly mixed with the water supplied thereto by the action of compressed air intermittently admitted into said bucket by a pipe 78 leading from a spring controlled valve 79 connected to a compressed air reservoir (not shown). Said air control valve 79 is operated and controlled by a tappet arm 80, friction roller 81, and adjustable cam 82 in a manner similar to that described with reference to the water control valve 70.

The mixing and tipping bucket 33, detachably mounted upon the revolvable table 66, is adapted to be raised to the required position for tipping by means of the yoked levers 65 pivotally attached by pins 83 to the machine frame and having hook-shaped ends 84, which pivotally engage trunnions 85 projecting outwardly from curved plates 86 bearing against wearing plates 86¹ affixed to opposite sides of the bucket 33. The plates 86 carrying the trunnions are loosely mounted in a channel 87 arranged peripherally on the bucket at a point slightly below its horizontal centre line. This channel is formed by fixedly securing a pair of metal rings 88 of angular section around the bucket, and it permits free rotary movement to be imparted to the bucket 33 whilst supported upon and revolvable with the table 66.

An angular metal ring 89 is fixedly secured to the lower portion of the mixing bucket 33 and engages a groove 90 formed in the lower end of a pair of depending arms 91, the upper end portions of which latter are perforated at 92 to revolvably accommodate the trunnions 85. These depending arms 91 ensure that said bucket maintains its balance during the tipping operations. Each of the yoked levers 65 (pivotally supporting a tipping bucket 33) also pivotally supports a tapped nut 93, through which is threaded a vertically disposed elevating screw 94 having its upper end revolvably supported in a bearing 95 formed on or secured to a stationary beam 96 of the machine frame. The lower end of said screw 94 is likewise revolvably mounted in a bearing 97 and furnished with a bevel friction wheel 98 to which rotary motion alternately in opposite directions is imparted by means of a pair of sliding friction wheels 99 which are placed alternately in engagement with said friction wheel 98 by means of tappets or lugs 99ª formed on the opposite sides of a timing wheel 100.

The friction wheels 99 operating in conjunction with the time wheel 100 rotate the elevating screw 94 in the required direction to raise the bucket 33 clear of the revolvable table 66 and to a position so that it can be readily tipped. The tipping mechanism comprises a rope 101 from a winding drum 102 rotated by a pair of grooved friction wheels 103 and 104 which are brought into and out of engagement with one another by the raising and lowering of the yoked lever 65. For this purpose, a rocking lever 105 is pivotally mounted upon a pin 106 supported in a bracket 107 secured to the beam 96, and it has one end pivotally attached by means of a connecting rod 108 to the yoked lever 65, while its opposite end is pivotally attached by means of a rod 109 to a trip lever 110. This lever 110 is revolvably mounted upon a spindle 111 which is stationary in brackets 112.

This spindle loosely supports an eccentric 113 which latter revolvably supports the winding drum 102 and the lower grooved friction wheel 104 formed integrally with said drum.

A ratchet wheel 116 is formed on or secured to the side of the grooved friction wheel 104 and its teeth are adapted for engagement by a pivoted pawl 117 to prevent back-lash of the winding drum 102, until such time as it is required to lower the bucket 33 onto the revolvable table 66 after its plaster contents have been discharged.

Fixedly secured to the opposite end of the eccentric 113 is a lever arm 117¹ having its free end pivotally attached by means of a rod 117² to the yoked lever 65, and adapted, during the raising of said arm, to elevate the lower grooved friction wheel 104 into engagement with the upper friction wheel 103 (to which continuous rotary motion is imparted) thereby causing rotary motion to be transmitted to the winding drum for the winding-up of the rope 101. This action causes the bucket to be brought to the required tipping position for discharging its contents. The lowering of said yoked lever 65 causes the friction wheel 104 to be lowered out of engagement with the constantly revolving friction wheel 103.

Simultaneously the trip-lever 110 contacts with the pawl 117 causing its disengagement from the teeth of the ratchet wheel 116, thereby enabling the winding drum 102 to automatically rotate in the opposite direction upon the eccentric 113 whereby the bucket 33 is automatically lowered to its normal and vertical position upon the revolvable table 66 so as to receive a fresh charge of plaster material from the telescopic chute 45.

Each of the combined tipping and mixing buckets 33 has its upper portion bellmouthed so as to facilitate the emptying of the plaster mixture into inclined troughs 118 adapted to deliver the same into a stationary distributing tub 119. This tub is arranged at a slight angle to the vertical and is furnished with discharge orifices 120 disposed above splasher distributers 121.

The plaster mixture within the distributing tub 119 is maintained in a state of agitation by radial agitator arms 122 secured to a vertical spindle 123 which is driven by overhead bevel gearing 124 from a transmission shaft of the machine.

In order to prevent the discharge orifices 120 in the distributing tub 119 from being choked by the plaster material and to facilitate the flow of the same therethrough, an intermittent supply of compressed air in the form of a spray is delivered into said distributing tub by the pipes 125. The intermittent air supply is controlled by a valve 126 which is operated by a tappet arm 127 and a cam 128 in a manner similar to that hereinbefore described with reference to the control valve for the admission of air and water to the mixing and tipping tubs 33.

The plaster splasher and distributer units 121 for delivering the first layer of plaster material on the tables or moulds 3 as they pass under the same are constructed and set at a required inclination so that the plaster material will be delivered fan-fashion downwardly and outwardly in the direction of travel of the moving tables 3.

Each of the splasher distributers is constructed as illustrated in Figures 17, 18 and 19 having a downwardly inclined cover plate 129 wherein is formed a central orifice 130 about a central boss 131 adapted to receive the square end portion 132 of a vertically disposed revolvable spindle 133, and is fixedly secured to said square spindle portion by a cap nut 134. The splasher distributer is furnished with a series of radially disposed vanes 135 which are of arched or semi-circular shape in cross-section, and openings 136 are formed in the bottom plate 137 to permit the plaster material, as it is delivered into the splasher distributer through the central orifice 130, to be directed in a splashing manner in a downward direction and spread evenly over the surface of the table or mould as it passes beneath the same.

The vertical spindle 133 is revolvably mounted in ball bearings (not shown) fitted in a stationary sleeve 138 which is fixedly secured by straps 139 to one of the vertical posts 140 forming portion of the machine frame. A bevel pinion 141 is mounted on the upper end of the vertical spindle 133 and is driven at a required speed by a bevel wheel 142 on a horizontal lay shaft 143 to which motion is transmitted by approved means from the main or alternatively from a driven shaft of the machine.

Each table 3 having evenly distributed thereon the predetermined charge of plaster material to form the first layer thereof during its forward travel passes under a stationary wiper device which is adapted to automatically level off the plaster material. This wiper device is arranged in advance of the splasher distributers and comprises a pair of bow-shaped flat metal bars 144 arranged on edge, between which is secured by means of bolts 145 a series of short lengths 146 of rubber or other suitable resilient material extending downwardly. When the table passes under this wiper device, the depending rubber strips 146 will contact with unequalities in the surface of the plaster material and level off the same so as to effect a uniform thickness of the first layer of material.

The bow-shaped metal bars 144 are adjustably supported by vertcially arranged screw-threaded rods 147 which pass through brackets 148 secured to the machine frame and furnished with adjusting nuts 149, the adjustment of which regulates the height of the rubber strips 146 relatively to the plaster material on the table.

Positioned at a short distance in advance of said wiper is a vibratory element designed to act in a manner as will effectively burst any air bubbles which may be formed in the plaster material and remain therein after passing under said wiper. This vibratory element consists of a strip 150 of rubber or other resilient material which is clamped between a pair of transversely disposed flat metal bars 151 supported upon the lower ends of spring members 152. The upper ends of these spring members are fastened to a transverse beam 153 that is secured to posts 154 positioned one at each side of the machine frame.

Vibratory motion is imparted to the transverse metal bars 151 and the resilient strip 150 affixed thereto, by means such as toothed cams 155 (or star wheels) fixedly mounted upon a transverse shaft 156 mounted in bearings 157 secured to the machine frame and driven from the main driving shaft by suitable power transmission means. The teeth of the cams 155 during rotation successively engage with the spring members 152 and thereby impart a rapid vibratory action to said resilient strip so as to effectively burst any air bubbles in the plaster mixture on the table or mould.

Arranged at each side of the machine frame is a wiper plate 158 and these are fixed to the lower ends of screw-threaded rods 159 which are vertically adjustable by means of nuts 160 in brackets 161 secured to the machine frame. These wiper plates are set angularly to the travel of the moving tables 3, and in action they remove surplus plaster material from the edges of the table in its forward travel and direct any accumulated plaster material back towards the centre of the travelling table.

The travelling tables or moulds upon which the first layer of plaster material to form the front smooth surface of the plaster sheet has been deposited and evenly spread, are conveyed forwardly to receive the bonding and reinforcing fibrous material delivered from a teasing and distributing device illustrated by Figure 2. The main portion of the teasing device 162 may be of any well approved type or design known in the art, but it is characterized by having a knife or blade 163 to effect leaning of the upper of the intake rollers 164.

Said teasing device is arranged at a predetermined position above the tables or moulds, and a blower 165 is provided whereby compressed air is forced into the delivery chute 166 and causes the teased material to be automatically delivered to a second teasing and distributing device 167 which is arranged in close proximity to the moving table and progressively delivers the bonding material and evenly distributes the same over the plaster upon said tables or moulds as they pass thereunder.

In lieu of the compressed air force for delivering the teased hemp to the distributing device, we may employ endless travelling belt conveyors 168 as illustrated by Figure 33 and which are so arranged as to convey the teased hemp from the main teasing device 162 directly to the plaster material, spread upon the moving tables.

The tables or moulds after the bonding and reinforcing fibre has been deposited onto the plaster are carried forwardly to another plaster mixture splasher distributer which is similar to that which has been described for progressively delivering the first layer of plaster mixture onto the tables or moulds, but it is characterized by the direction of distribution of said second layer plaster mixture, which is of great importance in effecting efficient binding of the reinforcing material.

It will be understood that the direction of delivery by splashing action of the first layer of plaster material is in the same direction as the travel of the tables or moulds, but the splashing distribution of the second or binding layer of plaster material is in the opposite direction, that is to say, it is delivered in a direction against the said travel of tables or moulds.

It has been found in practice that by delivering and distributing the second or binding layer of plaster material onto the hempen fibre constituting the bonding and reinforcing material, in an opposite direction to the travel of the tables, said mixture will more thoroughly impregnate the reinforcement and effect a perfect bonding of the materials.

The tables 3 as they pass from under the splashing distributers delivering the second layer of plaster material upon the reinforcement travel under a transversely arranged reciprocating pressure roller 169 which applies a required pressure to the now plastic composite sheet or slab, and ensures binding of the reinforcing fibrous material with the plaster for the production of a sheet or slab of uniform thickness.

The spindle 170 of the pressure roller is revolvably mounted at each end in sliding bearings 171 supported on a bearing plate 172 fixed to the machine frame in such a manner as to permit a continuous reciprocating motion being imparted to said roller by eccentric rods 173. These rods are actuated by eccentrics 174 fixedly mounted upon a transverse shaft 175, on one end of which is fitted a driving pulley 176 to receive a power transmission belt (not shown).

Fixedly attached to each of the sliding bearings 171 supporting said pressure roller and disposed interiorly of the machine frame is a longitudinal guard member or plate 177 which slidably moves across the outer face of a stationary baffle 178 mounted on the machine frame, which baffle may be longitudinally adjustable. A leaf spring 179 ensures said guard member 177 being maintained in operative contact with said baffle. This arrangement of baffles and guard members at each side of the machine prevents any escape of plaster mixture over the sides of the moving tables or moulds 3 during and following the operation of said reciprocating pressure roller.

As a further means for ensuring the production of sheets or slabs of uniform thickness having a perfectly flat surface, a transverse levelling roller 179$^a$ is revolvably and slidably mounted in bearings 180, 181 and 182 secured to or supported upon the machine frame. In order that a combined rotary and longitudinal reciprocating movement may be imparted to said levelling roller, one end of the same, after passing through the bearing 181, is slidably mounted in a revolvable sleeve 183 and is capable of being rotated therewith by means of a feather 184 secured in said sleeve and engaging a feather-way 185 formed in said roller. The sleeve 183 is revolvable in the bearing 182 and has a pulley 186 fixedly mounted on its outer end for transmitting rotary motion to said roller by means of a power transmission belt.

The opposite end of the levelling roller 179$^a$ which is revolvably and slidably mounted in the bearing 180 is secured to a vertically disposed rod 187, the lower end of which is pivotally attached to a bracket 188 secured to the machine frame. The upper end of said rod 187 is pivotally attached by a connecting rod 189 to a crank disc 190 mounted on the end of a short shaft 191. This shaft 191 is revolvably mounted in bearings 192 carried by a vertical standard 193, and it is furnished with a driving pulley 194.

The combined rotary and longitudinal reciprocatory movement imparted to said levelling roller causes the same to function as a straight edge for finally producing a perfectly level and even rear surface on the progressively manufactured composite plaster sheets or slabs.

Washers 195 of rubber or other flexible material may be mounted upon the levelling roller 179$^a$ adjacent to the bearings 180 and 181 to prevent surplus plaster material from entering said bearings and likely to prejudice the efficient working of said roller.

It is important that correct timing should be obtained permitting the delivery of the fibres bonding and reinforcement upon the first layer of plaster at correct intervals and the delivery of the second coating of the plaster binding material upon the fibres. In our experiments we have found it advantageous to so time the movements of the various operative parts of the machine in such a manner that a period of about seven minutes elapses from the time that a table is first splashed with the first coating of plaster until the hempen fibres are delivered onto said plaster, and that a period of about four minutes elapses from the time of this operation until said table containing the fibre reinforcement and the second or outer coating of plaster travels to the discharge end of the machine.

When it is desired that the tables or moulds 3 containing the plaster sheets or slabs should be removed to a drying room or chamber, conveyor mechanism is employed to automatically elevate the tables or moulds and their contained composite sheets or slabs directly from the machine at the termination of their travel through the machine and conveyor mechanism is employed to lower the tables for moulding purposes and automatically feed the same to the conveyor chains 6. Conveyor mechanism for feeding the tables or moulds from the drying chamber on said conveyor chains 6 arranged at the feed end of the machine is illustrated in Figure 1. It comprises two pairs of vertically disposed and oppositely arranged conveyor chains 196 passing about sprocket wheels 197 and 198 which are fixedly mounted upon horizontal shafts 199 and 200 revolvably mounted in suitable bearings (not shown) and one disposed above the other.

The shafts 200 are driven by means of bevel gear wheels 201 from the shaft 23 of the main conveyor as is illustrated by Figure 4.

Metal brackets 202 which are affixed to links of the chains 196 at a requisite distance apart are adapted during their downward travel to receive the tables or moulds and deposit the same directly onto the conveyor chains 6.

In order that the tables or moulds can be placed in correct position upon the brackets 202 at regularly timed intervals, they are placed in sequence upon oppositely arranged arms 203 having rollers 204. These arms project radially from bosses 205 which are mounted upon transverse shafts 206 revolvably supported in bearings 207 having adjustable caps 208 functioning as braking means for regulating the speed of said shafts.

The weight of a table upon the arms 203 is sufficient to partially rotate the shafts 206 and enable said table to be automatically lowered onto the brackets 202.

For the purpose of lowering the table at required intervals, ratchet teeth 209 are formed radially on the bosses 205. These teeth are adapted for engagement by a pivoted trip lever 210 which prevents rotary motion of the shaft 206 until such time as a lug 211 formed on the brackets 202, contacts with the free end of said trip-lever and causes it to be disengaged from said ratchet teeth 209, whereupon the weight of the table partially rotates said bosses 205 and the table is automatically lowered onto said supporting brackets 202.

The mechanism for elevating the tables or moulds with the manufactured sheets or slabs of composite material plaster is similar in design to the mechanism hereinbefore described for feeding the empty tables to the machine.

This elevating mechanism is illustrated diagrammatically in Figures 31 and 32, and it comprises conveyor chains 212 passing about sprocket wheels 213 and furnished with brackets 214 adapted to pick up the tables from the machine and elevate them to said drying room or chamber.

When a table has been elevated to the required height it is automatically removed from the brackets 214 by arms 215.

These arms project radially from bosses 216 fixedly mounted upon transverse shafts 217 furnished with chain and sprocket driving mechanism 218 to impart rotary motion to said shafts, which motion may be intermittent, or alternatively can be continuous at a relatively slow speed.

It will be understood that suitable time gear is employed to ensure that the movement of the radial arms will synchronize with the movement of the travelling brackets 214.

What we do claim is:—

1. In apparatus for the manufacture of composition building sheets or slabs, a feed hopper for powdered plaster having delivery orifices in the bottom thereof, a platform beneath said hopper, measuring bins slidable on said platform, cut-off plates on said bins to register with said hopper orifices, a screw conveyor, a telescopic chute, a sieve mounted on said chute, means imparting intermittent reciprocatory movement to said bins, means for continuously rotating said conveyor, and means for imparting oscillatory movement to said sieve.

2. In apparatus for the manufacture of composition building sheets or slabs, a telescopic delivery chute, horizontal tables, means for revolving said tables, combined mixing and tipping buckets supported by and revolvable with each table and receiving in sequence measured charges of plaster from said chute.

3. In apparatus for the manufacture of composition building sheets or slabs, telescopic delivery chutes, horizontal tables, means for rotating said tables, a combined mixing and tipping bucket supported by each of said tables and receiving in sequence measured charges of plaster delivered by said chutes, a water tank, valve controlled means for intermittently supplying water to said buckets, and means for elevating, tipping and lowering said buckets.

4. In apparatus for the manufacture of composition building sheets or slabs, a feed hopper for plaster, measuring bins receiving predetermined charges from said hopper, a conveyor, a sieve, a delivery chute, a revolvable bucket receiving from said chute a measured charge of plaster, valve controlled means intermittently supplying water to said bucket, means intermittently supplying compressed air to the contents of said bucket, and means for sequentially elevating, tipping and lowering said bucket.

5. In apparatus for the manufacture of composition building sheets or slabs, a chute for delivery of plaster, a mixing bucket receiving a charge of plaster from said chute, a tank supplying a water charge to said bucket, a spring pressed valve, a pivoted tappet arm, a revolvable shaft, a feather on said shaft, a cam slidable on said feather, and a roller on the lower end of said tappet arm actuated by said cam.

6. In apparatus for the manufacture of composition building sheets or slabs, a mixing bucket, means for elevating and tipping said bucket, inclined trough receiving from said bucket when tipped, a distributing tub receiving the mixed material from said trough, agitators mounted in said tub, discharge orifices in said tub, and compressed air means preventing the clogging of said orifices.

7. In apparatus for the manufacture of composition building sheets or slabs, a mixing bucket, means delivering predetermined charges of dried plaster and water to said bucket, mixing means in said bucket, means for automatically elevating and tipping said bucket, a centrifugal splasher, means for continuously rotating said splasher, and means for automatically delivering the tipped contents of said bucket to said splasher.

8. In apparatus for the manufacture of composition building sheets or slabs, in combination with a travelling mould table of centrifugal apparatus for distributing plaster mixture by splashing same on said table, said apparatus comprising a spindle, means for rotating said spindle, a casing having downwardly inclined top and bottom plates, said casing being mounted on and rotatable with said spindle, vanes of arched shape in cross-section arranged radially between said top and bottom plates, a feed opening in said top plate leading to the compartments formed in said casing by said vanes, and discharge gaps formed peripherally on said bottom plate.

9. In apparatus for the manufacture of composition building sheets or slabs, in combination with a frame, a guideway in said frame, a mould table travelling in said guideway, a centrifugal apparatus for distributing plaster mixture by splashing action on said table, a levelling wiper device comprising bars arranged in bow formation across said guideway, strips of resilient material secured to and depending from said bars, and means for adjusting the height of said bars with attached resilient strips.

10. In apparatus for the manufacture of composition building sheets or slabs, in combination, a travelling mould table, centrifugal apparatus for distributing plaster mixture by splashing the same on said table, a tamper device comprising spring arms, transverse bars mounted on said arms, a strip of resilient material depending from said bars, a rotatable shaft, toothed cams mounted on said shaft and intermittently engaging said arms and imparting vibratory movement to said resilient strip.

11. In apparatus for the manufacture of composition building sheets or slabs, in combination, a travelling mould table, centrifugal apparatus for distributing plaster mixture by splashing same on said table, and appliance for teasing and delivering fibers to the plaster mixture on said travelling table, said appliance comprising a primary teaser, a delivery chute, and a secondary teaser and distributer arranged at the lower end of said chute.

12. In apparatus for the manufacture of composition building sheets or slabs, in combination, a travelling mould table, centrifugal apparatus for distributing plaster mixture by splashing same on said table, an appliance for teasing and delivering fibres to the plaster mixture on said travelling table, said appliance comprising a teaser, a delivery chute, belt conveyors receiving the teased fibres from said chute and delivering the same to the plaster mixture on said travelling table.

13. In apparatus for the manufacture of composition building sheets or slabs, in combination, a travelling mould table, centrifugal apparatus for distributing plaster mixture by splashing same on said table, an appliance for teasing and delivering fibres to the plaster mixture on said travelling table, means for delivering teased fibres onto the plaster mixture on said table, bearing plates on the machine frame, bearings slidable in said plates, a transverse spindle revolvably mounted in said bearings, a pressure roller fitted on said spindle, said pressure roller being automatically rotated by the travelling mould table, and means for imparting constant reciprocating motion to said pressure roller.

14. In apparatus for the manufacture of composition building sheets or slabs, in combination, a travelling mould table, centrifugal apparatus for distributing plaster mixture by splashing same on said table, an appliance for teasing and delivering fibres to the plaster mixture on said travelling table, means for delivering teased fibres onto the plaster mixture on said table, bearing plates on the machine frame, bearings slidable in said plates, a transverse spindle revolvably mounted in said bearings, a pressure roller fitted on said spindle, said pressure roller being automatically rotated by the travelling mould table, means for imparting constant reciprocating motion to said pressure roller, guard plates fixed to said bearings, a stationary baffle on the machine frame, and a spring maintaining the guard plates against said baffle.

15. In apparatus for the manufacture of composition building sheets or slabs, a frame, a guideway in said frame, a mould table travelling in said guideway, a splasher unit distributing a first layer of plaster mixture onto said table in a forward direction, means for levelling said plaster mixture, means for distributing teased fibres to the first layer of plaster mixture, means for exerting pressure on said fibres, a second splasher unit distributing in a direction against the travel of said table a second layer of plaster mixture onto the fibro-plaster mixture on said table.

16. In apparatus for the manufacture of composition building sheets or slabs, a frame, a guideway in said frame, a mould table travelling in said guideway, centrifugal apparatus for distributing plaster mixture by splashing action onto said table, means for delivering teased fibres to the plaster mixture, means for delivering a second layer of plaster mixture to the fibro-plaster mixture on said table, a levelling roller arranged transversely of the travelling table, and means for imparting combined rotary and longitudinal reciprocating motion to said levelling roller.

17. In apparatus for the manufacture of composition building sheets or slabs, means for automatically depositing mould tables in sequence upon conveyors, said means comprising vertically arranged endless conveyors, brackets carried by said conveyors, shafts mounted above said conveyors, means for intermittently revolving said shafts, and arms projecting radially from said shafts and delivering said tables supported thereon to said brackets.

18. In apparatus for the manufacture of composition building sheets or slabs, means for automatically elevating mould tables with contained composite building sheets from the apparatus to a drying chamber, said means comprising vertically arranged endless conveyors, brackets carried by said conveyors, shafts mounted above said conveyors, means for intermittently revolving said shafts, and arms projecting radially from said shafts and removing said tables from said brackets.

19. Apparatus for the manufacture of composite building sheets comprising means for automatically placing a series of travelling mould tables in relative adjacent positions, a feed hopper, a plurality of mixing buckets, means for delivering predetermined charges of dry plaster from said hopper to said buckets, means for delivering to said buckets water in predetermined supply, agitating means in said buckets, centrifugal distributer unit splashing a first layer of plaster mixture on said mould tables, a levelling appliance, vibratory tamping element, means for delivering teased fibres to the first layer of plaster mixture, knife cleaning means in the fibre teasing mechanism, means for splashing a second layer of plaster mixture onto the fibro-plaster supported by said tables, pressure and levelling rollers acting on the table contents, and means for automatically elevating the tables with contained fibro-plaster sheets to a drying chamber.

In testimony whereof we affix our signatures.

JOHN A. HARRISON.
OTTO A. WASCHATZ.